United States Patent
Bertram et al.

(10) Patent No.: US 6,470,464 B2
(45) Date of Patent: *Oct. 22, 2002

(54) SYSTEM AND METHOD FOR PREDICTING COMPUTER SYSTEM PERFORMANCE AND FOR MAKING RECOMMENDATIONS FOR IMPROVING ITS PERFORMANCE

(75) Inventors: Randal Lee Bertram; Frederick Scott Hunter Krauss, both of Raleigh; Gregory J. McKnight, Chapel Hill, all of NC (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,680

(22) Filed: Feb. 23, 1999

(65) Prior Publication Data

US 2002/0133757 A1 Sep. 19, 2002

(51) Int. Cl.[7] .................................................. H02H 3/05
(52) U.S. Cl. ........................ 714/37; 713/100; 702/186; 707/2
(58) Field of Search ...................... 714/37, 6; 713/100; 711/114, 170, 141, 144, 173; 709/104; 707/2; 702/186

(56) References Cited

U.S. PATENT DOCUMENTS

| | | | | |
|---|---|---|---|---|
| 5,539,652 A | * | 7/1996 | Tegethoff | 364/490 |
| 5,611,069 A | * | 3/1997 | Matoba | 711/114 |
| 5,668,995 A | * | 9/1997 | Bhat | 709/104 |
| 5,732,215 A | * | 3/1998 | Boutaghou et al. | 710/74 |
| 5,867,714 A | * | 2/1999 | Todd et al. | |
| 6,016,503 A | * | 1/2000 | Overby, Jr. et al. | 709/104 |
| 6,098,153 A | * | 8/2000 | Fuld et al. | 711/134 |

* cited by examiner

Primary Examiner—Robert Beausoleil
Assistant Examiner—Rita A Ziemer
(74) Attorney, Agent, or Firm—Carlos Munoz-Bustamante

(57) ABSTRACT

A system and method of monitoring and analyzing the performance of a computer system and its components in a data processing network and for proposing changes to the network to improve the performance. The system involves identifying undesirable conditions (sometimes called bottlenecks) in the system, determining which bottlenecks are the most severe in affecting the performance of the system and in proposing changes to the components of the system to improve performance of the network. The present invention uses historical data and forecasting techniques to predict bottlenecks which have not occurred yet but which can be expected, so that further bottlenecks can be projected, along with a prediction interval to indicate the confidence of the prediction. The further projections and the prediction interval are provided in a graph which is available to the user over the Internet, if desired, using HTML and hot links.

12 Claims, 14 Drawing Sheets

Component Types:

Components:

Monitors:

Monitor Types:

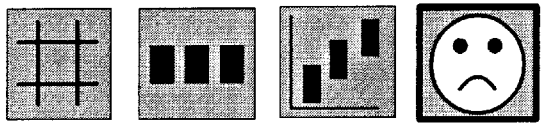

Performance Analysis Recommendations

System E   Go to details
Bottleneck: LAN Adapter. To improve performance:
* Add faster LAN technology to LAN Segment 0.
* Add another LAN adapter and migrate users from LAN Segment 0 to the new LAN subnet.

System B   Go to details
Bottleneck: CPU. To improve performance:
* Upgrade to faster or additional CPUs.

Monitors
CPU Utilization
Disk 1: Utilization
Disk 2: Utilization
Drive C: Space Remaining
Drive D: Space Remaining
Locked Memory
Memory Usage
NDIS - Adapter 0 - Packets Rec
NDIS - Adapter 0 - Packets Tran
Segment 0 - Network Utilization

System C
Disk 1: Utilization

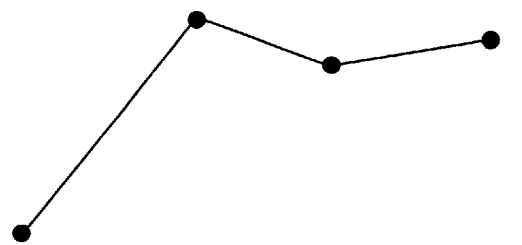

*FIG. 6*

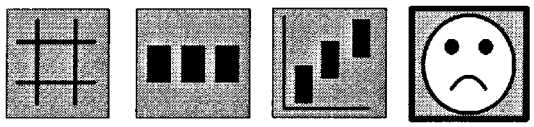

System B Details
Bottleneck: CPU. This bottleneck occurred 119 out of 189 hours that this system was analyzed, or 63% of the time. It was observed between Tue 11 Aug 1998 10:00 EDT and Mon 31 Aug 1998 10:00 EDT.

To graph the constrained resources, click on:
\*     CPU Utilization (constrained for 100% of the 119 hours of bottleneck time)

To improve performance:
\*     Upgrade to faster or additional CPUs.

System C Details

| Monitors<br>CPU Utilization | System C<br>Disk 1: Utilization |
|---|---|
| Disk 1: Utilization | |
| Disk 2: Utilization<br>Drive C: Space Remaining<br>Drive D: Space Remaining<br>Locked Memory<br>Memory Usage<br>NDIS - Adapter 0 - Packets Rec<br>NDIS - Adapter 0 - Packets Tran<br>Segment 0 - Network Utilization | 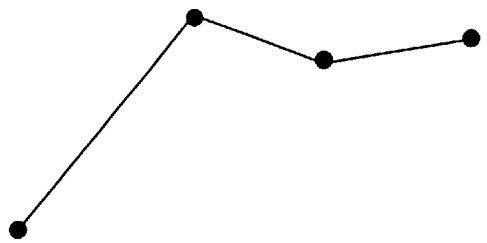 |

*FIG. 7*

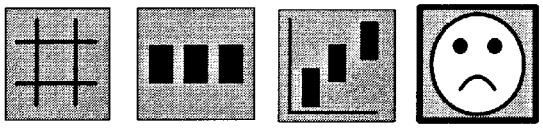

System B Details
Bottleneck: CPU. This bottleneck occurred 119 out of 189 hours that this system was analyzed, or 63% of the time. It was observed between Tue 11 Aug 1998 10:00 EDT and Mon 31 Aug 1998 10:00 EDT.

To graph the constrained resources, click on:
*     CPU Utilization (constrained for 100% of the 119 hours of bottleneck time)

To improve performance:
*     Upgrade to faster or additional CPUs.

System C Details

| Monitors |
|---|
| CPU Utilization |
| Disk 1: Utilization |
| Disk 2: Utilization |
| Drive C: Space Remaining |
| Drive D: Space Remaining |
| Locked Memory |
| Memory Usage |
| NDIS - Adapter 0 - Packets Rec |
| NDIS - Adapter 0 - Packets Tran |
| Segment 0 - Network Utilization |

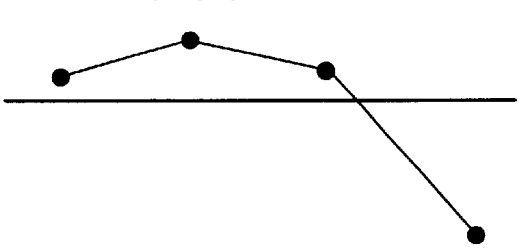

*FIG. 8*

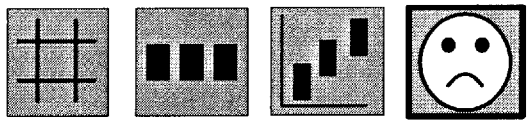

System A Details
Bottleneck: LAN Adapter. This bottleneck has not occurred yet, but it may occur on Tue 29 Sep 1998.

To graph the constrained resources, click on:
* NDIS - Adapter 0 - Packets Received To improve performance:
* Add faster LAN technology to LAN Segment 0.
* Add another LAN adapter and migrate users from LAN Segment 0 to the new LAN subnet.

Monitors
CPU Utilization
Disk 1: Utilization
Disk 2: Utilization
Drive C: Space Remaining
Drive D: Space Remaining
Locked Memory
Memory Usage
NDIS - Adapter 0 - Packets Re
NDIS - Adapter 0 - Packets Tran
Segment 0 - Network Utilization

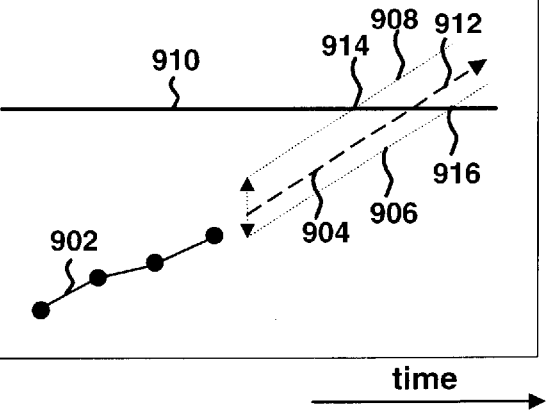

*FIG. 9*

SYSTEM AND METHOD FOR PREDICTING COMPUTER SYSTEM PERFORMANCE AND FOR MAKING RECOMMENDATIONS FOR IMPROVING ITS PERFORMANCE

CROSS REFERENCE TO RELATED PATENTS

The present invention is related to an invention "Method and System for Providing Performance Data", as described in a pending patent application Ser. No. 09/089,109 filed Jun. 2, 1998 by Randal Bertram et al. This patent is sometimes referred to as the Performance Data Patent.

The present invention is also related to "Method and System for Graphically Displaying Trend and Range Data for a Variety of Systems" as described in a pending patent application Ser. No. 09/088,525 filed Jun. 2, 1998 by Randal Bertram et al. This patent is sometimes referred to herein as the Performance Display Patent.

A concurrently-filed-patent application (RAL9-99-00) entitled "System and Method for Monitoring and Analyzing Computer System Performance and Making Recommendations for Improving it", by Randal Bertram and Gregory McKnight, two of the inventors of the present patent, may also be relevant to the subject matter of this patent. This patent is sometimes referred to as the System Recommendation Patent.

A concurrently-filed patent application (RAL9-99-010) entitled "System and Method for Identifying Latent Computer System Bottlenecks and for Making Recommendations for Improving Computer System Performance", by Randal Bertram and Gregory McKnight, two of the inventors of the present patent, may also be relevant to the present invention. This patent is sometimes referred to as the Latent Bottlenecks Patent.

The Performance Data Patent, the Performance Display Patent, the System Recommendation Patent and the Latent Bottleneck Patent are all assigned to the assignee of the present invention and the specification and drawings of each patent are specifically incorporated herein by reference.

1. Field of Invention

The present invention relates to capacity management in a computer system such as a network or server and, more particularly, to a method and system for analyzing the past performance of components of a computer system and projecting the results into the future, applying rules to the results to identify bottlenecks which have not yet occurred but are likely to occur and to make recommendations for ameliorating the bottlenecks.

2. Background Art

Managing a computer system which includes a plurality of devices such as networks or servers is of special interest to data processing (or information technology) personnel. The computer systems typically include a plurality of diverse devices such as memory, disks, local area network (LAN) adapters and central processing units (CPUs) which interact in various interrelated ways when a variety of data processing applications are used in the computer system. As the systems get larger and more complex, these interactions become hard to define, model or predict the relationships between the devices, and hence the capacity of the system becomes difficult to manage. These systems are quite expensive to install and changes to the system involve a significant investment, so, while an investment is desirable which will improve the performance of the computer system, some investments in improvements to the computer system would not be worthwhile since the performance of the overall system would not improve.

Frequently, the performance of the computer system or network is less than it could be because only or more of the components is not appropriate for application loading of the computer system (or a network or server). It is desirable to know what changes to the computer system would be worthwhile in improving the capacity of the computer system and making those changes while avoiding changes which would not have a significant benefit to the performance of the computer system. The System Recommendations Patent describes the inventors' solution to this problem. However, the System Recommendation Patent does not make any projections as to how the computer system is likely to operate in the future.

One way to address the proper components for the loading of the system is to provide a model of the load and simulate the system to provide an optimum (or desirable) combination of elements. While there are numerous simulation techniques, they all rely on approximations of the loading and the components, and, as the systems become larger and more complex and the loading becomes more complex, the simulations are approximations whose accuracy and reliability is subject to significant doubt.

Another approach to predicting performance of a complex computer system involves active monitors, or adding a known load to an existing system and measuring the resulting output and effect of the load. This requires that the system be available for experimentation and that the added load operate in a known manner, both of which are assumptions that may work in some instances but not in others. For example, BlueCurve Dynameasure by BlueCurve, Inc. Intentionally induces an artificial workload to determine performance characteristics of a computer system. Such an active monitor is disruptive to the network (in that it interferes, at least to some extent, with the ongoing work of the computer system and the artificial load on the network may not accurately reflect the real world actual work of the computer system, either now or in the future.

Another way to manage the capacity is described in the Performance Management Patent and involves sampling of indicators of system activity. These indicators can be displayed as described in the Performance Display Patent, if desired. In any event, the data must be interpreted by a professional who has experience in looking at the results and interpreting the data to make recommendations. Unfortunately, these experts are in demand and not enough exist, so it is unlikely that a network expert would be available to analyze the results and to make suggestions for improvement at any given time and having the local expert is an inefficient use of his time and expertise.

Accordingly, the prior art systems for capacity management are limited and have undesirable limitations and disadvantages.

SUMMARY OF THE INVENTION

The present invention overcomes the limitations and disadvantages of the prior art systems by providing an improved capacity management system which is easy to use and which provides an indication of the bottleneck(s) in the system, in an ordered list, along with recommendations on how to improve the computer system, based on the use of passive monitors. The system projects the performance into the future using conventional algorithms and uses rules to determine potential bottlenecks which have not occurred but are projected as likely to occur in the further. Based on the predictions, the present invention projects when a bottleneck is likely to occur and makes recommendations as to how to ameliorate the system.

The present invention also has the advantage that analysis of the performance data of the system allows one to extend the trends into the future, with a confidence range based on statistical analyses, and allows for the inclusion of appropriate warnings about the reliability of the projections.

The improved capacity management system uses data which is typically available from hardware and software and uses software tools which are typically available. Thus, it is not necessary to find some obscure data on the computer systems or to add additional overhead (such as additional hardware or new software) to the computer system in order to obtain the necessary data to make recommendations on improving the computer system.

The present invention also allows use of statistical techniques for projections and for the use of confidence ranges, if desired, using conventional statistical methods. As the statistical tools become better defined and/or subject to further analysis, the substitution of new techniques for the previous projection and analysis techniques can be accomplished.

The present system has the advantage that it does not require a simulation program and it does not require that the user find or create unusual sets of data (like artificial loads of an active monitoring system like BlueCurve Dynameasure) which other prior art capacity management systems may require for analysis.

The present system avoids the need for consulting with an expert in the field of analyzing computer system performance to look at the various data which is available on the performance of the computer system and make judgments of whether the system has bottlenecks and whether changes to the system could make a significant improvement to its performance.

The present invention has the advantageous effect that the recommendations can be sorted according to rules, such as addressing the most severe problem first, and can be combined so that the same problem is reported only once. The present invention also allows the sorting of problems which have occurred before those which are merely predicted to occur, if desired.

The computer system of the present invention has the benefit that interactions between the performance of different parts of the system are taken into consideration during the analysis and the recommendations.

The present invention also has the advantage that certain periods of performance (like evenings and/or weekends) may be disregarded, if desired, in order to avoid the impact on the analysis of periods not particularly relevant to the users of the system. That is, the periods of greatest concern to the users can be focused on, either completely or with appropriate emphasis, and periods of lesser importance can be ignored or considered less important.

The disclosed computer system also has the capability of averaging system performance over a period of time to prevent peak periods of short duration from unduly influencing the data and the conclusions about the performance of the system. As with other monitors, the duration of the averaging may be adjusted by the user, if desired.

The present invention has the further advantage that the results can be made available over an Internet or intranet using hypertext markup language (HTML) format so that the results can be monitored from a remote site. The use of information in HTML format allows additional information (such as backup information and graphs, additional details, or a source of further information, such as an expert) to be made available by hot-links as well.

One further advantage of the present invention is that additional detail on the results can be added, such as warnings as to the strength of the recommendations and the confidence in the recommendations. If certain monitors are not present or have data only for a limited time, the results may be less reliable than if the same information was available over a longer period of time, and the system of the present invention has the advantage of providing information on the quality of the data on which the recommendations are made.

The present invention also has the advantage that the indicators are programmable and the definition of a bottleneck may be changed by the user. In this way, the user has his choice of a predetermined definition of a bottleneck or the use of his own customized version of a bottleneck. The present invention also includes preset parameters which defme reliable data, but, again, the user can override these parameters, if desired, to customize his system.

Other objects and advantages of the present invention will be apparent to those skilled in the relevant arts in view of the following description of the drawings, taken together with the accompanying drawings and the appended claims.

BRIEF DESCRIPTION OF THE DRAWINGS

The following is a description of the present invention, described with reference to the accompanying drawings in which:

FIGS. 5, 6, 7 and 8 are views of illustrative reports created by the process described in reference to the flow chart of FIG. 4.

FIG. 9 is an illustrative report of the forecasting or predicting feature of the present invention, showing the future projection with a dashed line and the confidence interval or prediction interval with dotted lines, above and below and somewhat diverging.

DETAILED DESCRIPTION OF THE PREFERRED EMBODIMENT

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present invention could be implemented with either greater or lesser specificity, depending on the needs of the user.

Further, some of the features of the present invention could be used to advantage without the corresponding use of other features described in the following paragraphs. As such, the present description should be considered as merely illustrative of the principles of the present invention and not in limitation thereof, since the present invention is defined solely by the claims which follow.

The present invention relates to an improvement in providing information about the capacity of a computer system and whether or not the system is constrained, or limited, by a performance-limiting condition which has sometimes been referred to as a bottleneck. In the event that one or more bottlenecks are detected, then the system provides an indication of the bottleneck as well as one or more recommendations for improving the performance of the computer system by alleviating the bottleneck(s). The following description id presented to enable a man of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Figure 1A:
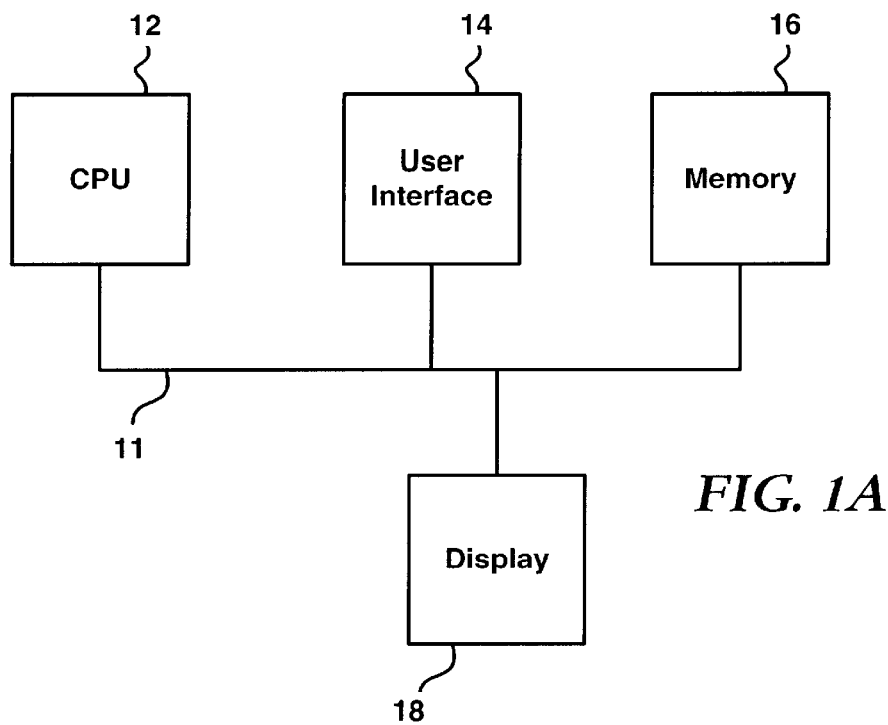
FIG. 1A is a block diagram of a computer system illustrative of the environment of the present invention.

FIG. 1A is a block diagram of a computer system 10 useful in the present invention. The computer system 10 includes a central processor unit (CPU) 112 coupled to a system bus 11. Also coupled to the system bus 11 are a user interface 14, a memory 16 and a display 18. The user can input information to the computer system 10 through the user interface 14 and the display 18 allows the user to view information form the system 10, for example, in graphical or text form (or, in some cases, in both forms).

Figure 1B:
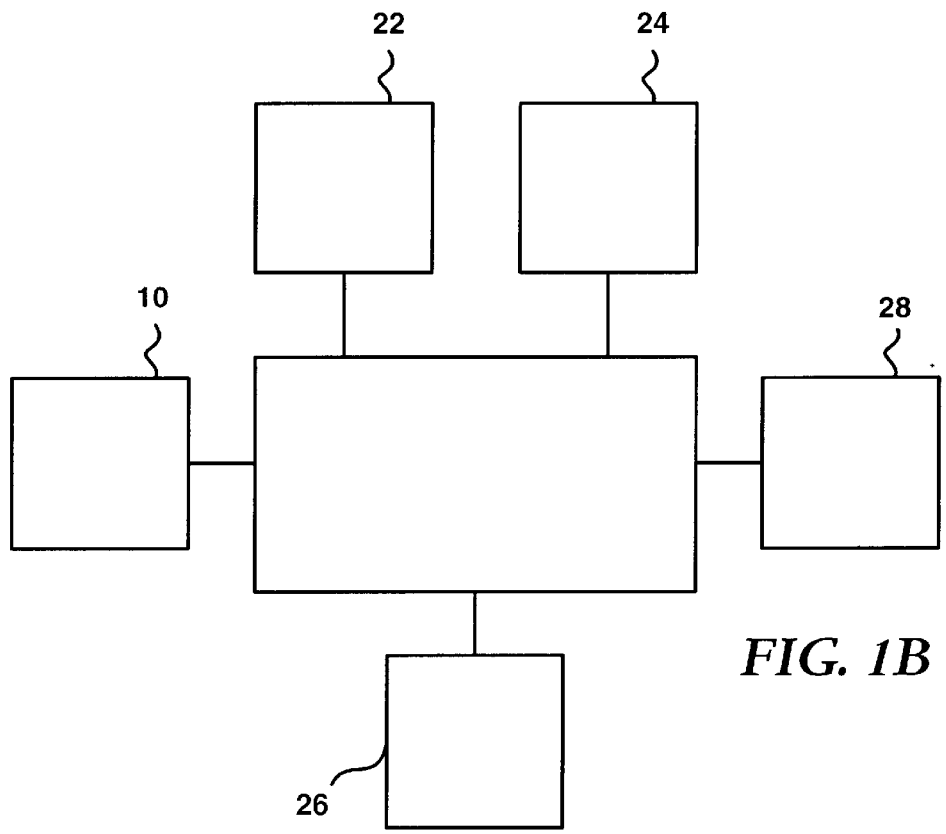
FIG. 1B is a block diagram of a computer network of the type used with the present invention.

FIG. 1B shows a block diagram of a data transmission network 20 (sometimes simply referred to as a network) of the type which may be used with the present invention. The data transmission network 20 includes the computer system 10 of FIG. 1A as well as other components 22, 24, 26 and 28. These components could be other computer systems, servers, printers or other computer apparatus. Although this figure depicts a network of five devices, in actuality, the network may include a variable number of components, from a small number (1 or 2) in an unusual situation to a very large number (thousands of systems).

Referring to FIGS. 1A and 1B, a user of the computer system 10 may wish to view the performance of the network 20 on his display 18. The performance of the network 20 may be of concern to the network administrator, for example, in managing the performance of the network 20. Applications which reside on the user's system 110 (but are not shown) allow a query of the systems attached to the network 20 to receive performance data on the system. This performance data, which are typically referred to as monitors, are time-varying information on the activity sensed at some point in the network, and may be an indication of the use of a resource, either in absolute amount (such as messages transmitted) or in relative terms (the portion of the memory which is used).

Figure 2:
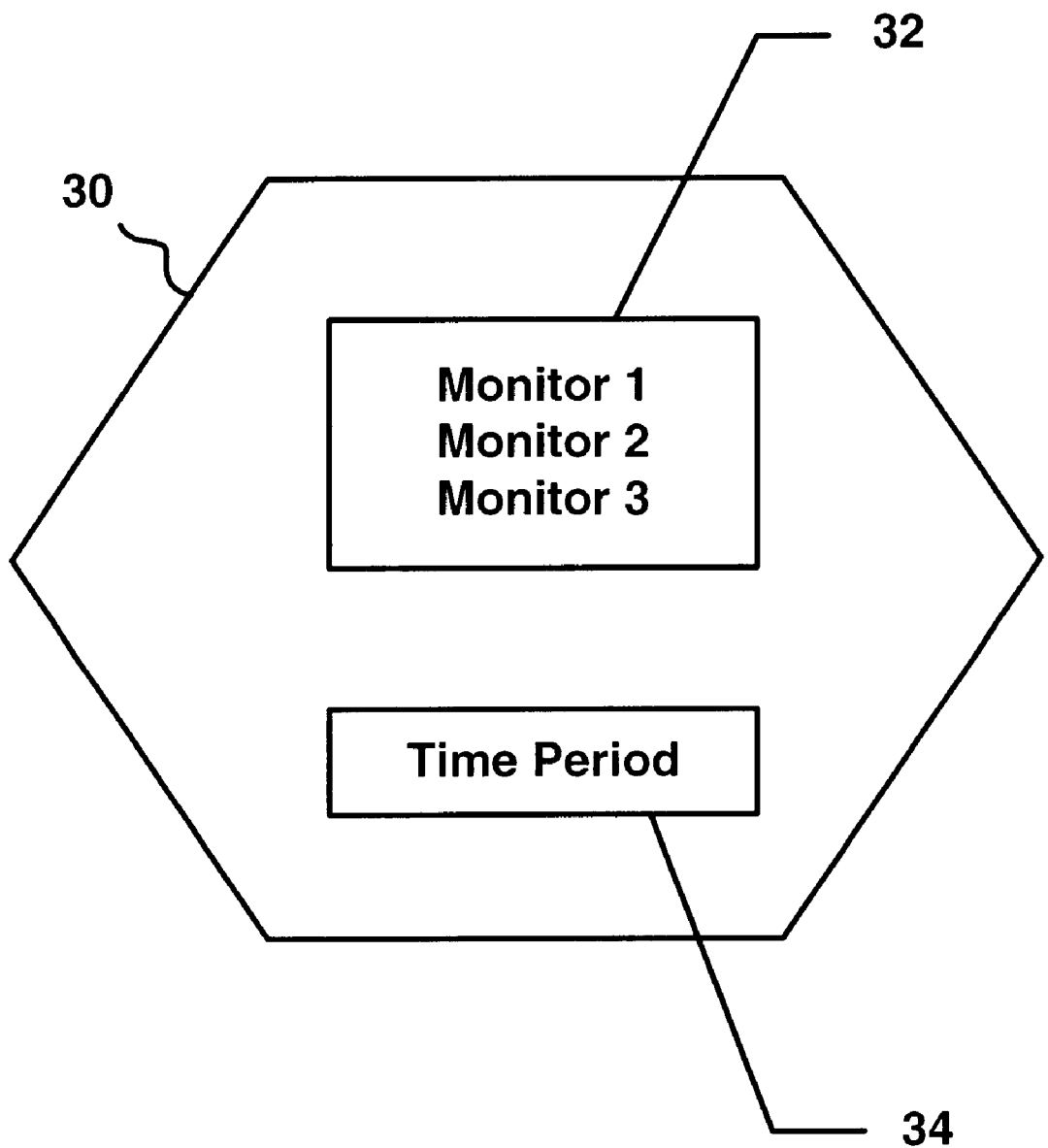
FIG. 2 is a a view of a display showing a reporting of monitors used in the previous versions of a monitor reporting system.

FIG. 2 is a diagram of a prior art system for viewing the performance of a computer system. In response to an inquiry, various monitors (shown here as monitor 1, monitor 2 and monitor 3) are displayed in a box 32, along with the time period displayed in box 34. A separate inquiry at another time or listing other monitors would display the requested monitors at the requested time in a subsequent display, leaving the synthesis to the user to put the data together and reach appropriate conclusions.

Figure 3:
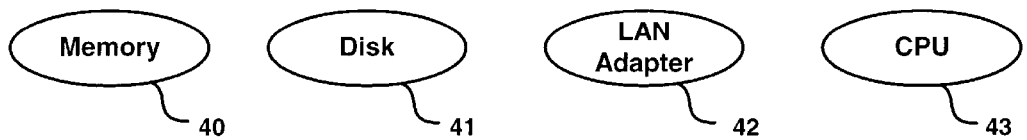
FIG. 3 is an illustration of the monitors and monitor types which may be used in the present invention, for a system which includes the components and component types shown.
Figure 3:
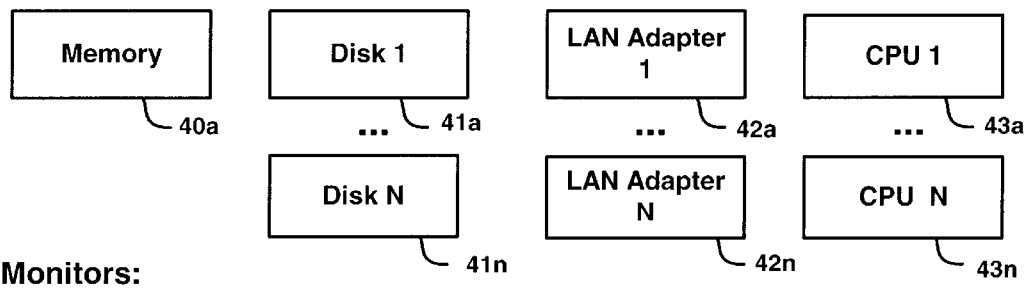
Figure 3:
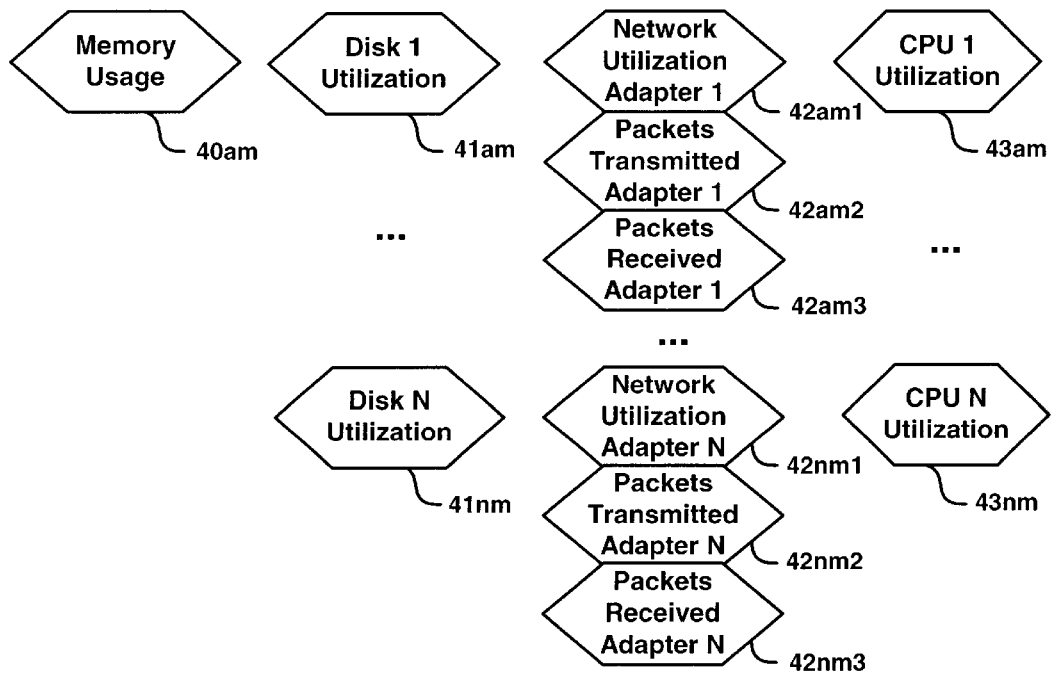
Figure 3:
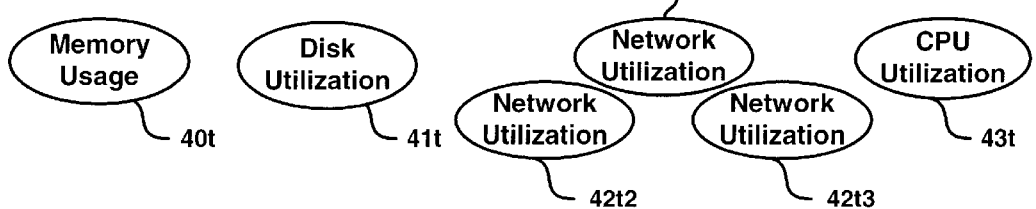

FIG. 3 is an illustration of the component types which may be present in a computer system, which may include individual servers, networks and other components such as printers. The component types include memory 40, disk(s) 41, LAN adapter(s) 42, and central processor unit(s) or CPU 43. The memory type 40 is shown as a single memory 40$a$, with the disk 40 consisting of disk 1 (41$a$) through disk n (41$n$). The LAN adapter 42 includes LAN adapter I (42$a$) through LAN adapter n (42$n$) and the CPU is shown with CPU 1 (43$a$) through CPU n (43$n$). Associated with each of the components is at least one monitor, with the added subscript "m" added to designate the monitor associated with a given device—e.g., the monitor for memory usage 40$am$is associated with the memory 40$a$. Since there are several monitors for the LAN adapter 42$a$, these are indicated as a first monitor—utilization—(42$am$1) through a third monitor—packets received—(42$am$3). The monitors can be grouped into types, such as memory usage 40T, disk utilization 41$t$, etc., corresponding to the respective monitors. The monitor types for the network can include network utilization 42$t$1, packets transmitted 42$t$2 and packets received 42$t$3. CPU utilization 43$t$ is the type of monitor associated with the CPU monitor.

FIG. 4 (consisting of FIGS. 4A, 4B, 4C and 4D) is a flow chart of process used in the preferred embodiment of the present invention. .

Figure 4A:
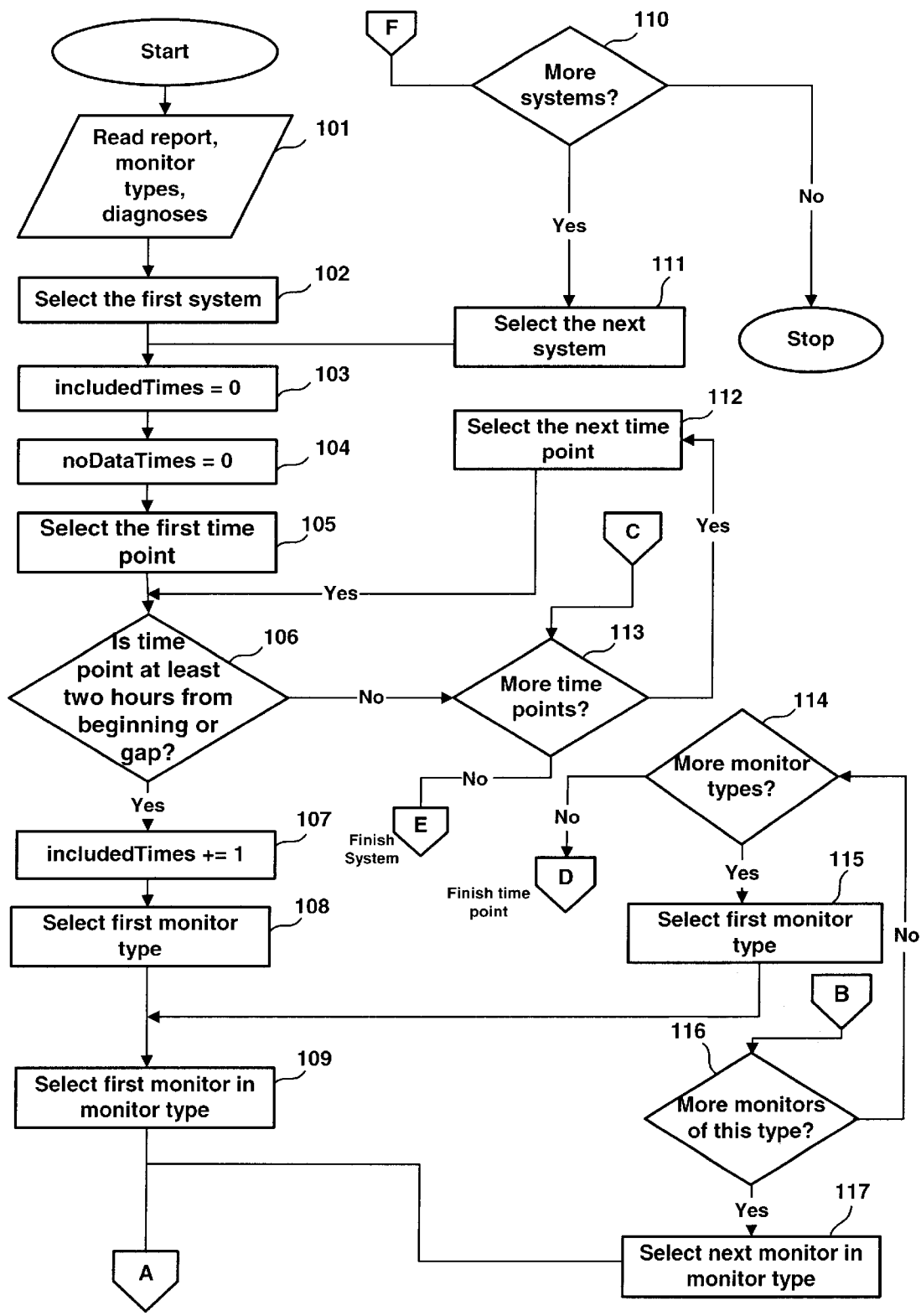
FIG. 4 (comprising FIGS. 4A, 4B, 4C and 4D) is a flow chart of logic of the preferred embodiment of the present invention.
FIG. 4E and 4F are modifications to the basic flowcharts of the System Recommendation Patent for the forecasting and prediction features of the present invention.

This flowchart of FIG. 4A begins by reading the three inputs (report, monitor types and diagnosis). The flowchart shows that at the highest level, the method consists of several nested loops. The outer loop iterates through the systems in the report. This loop involves boxes 102, 110, and 111.

The next loop iterates through the time points in the report. This involves boxes 105, 112, and 113. This loop skips the time points that have less than two hours of consecutive data, via box 106. This is because the next flowchart will average the previous two hours of data. If a time point is less than two hours into the report, then the method goes to the next time point in box 113 and 112. Likewise, if the time point is less than two hours after a gap, then the method goes to the next time point. A "gap" occurs when the user has requested a report that includes only certain days of the week and hours of the day. These are called "inclusion times" in the Performance Data Patent. For example, if only the hours 9:00 am to 5:00 pm are included in the report, then there is a gap in the data between 5:00 pm and 9:00 am the next day. The first two hours, from 9:00 am to 11:00 am, are skipped in this flowchart.

The time loop keeps a counter of how many time points were analyzed in box 107. This way it can leave out the times that were skipped in 106 when it does the analysis. The next loop iterates through the monitor types via boxes 108, 114, and 115. The final loop iterates through the monitors of that type in boxes109, 116, and 117.

Figure 4B:
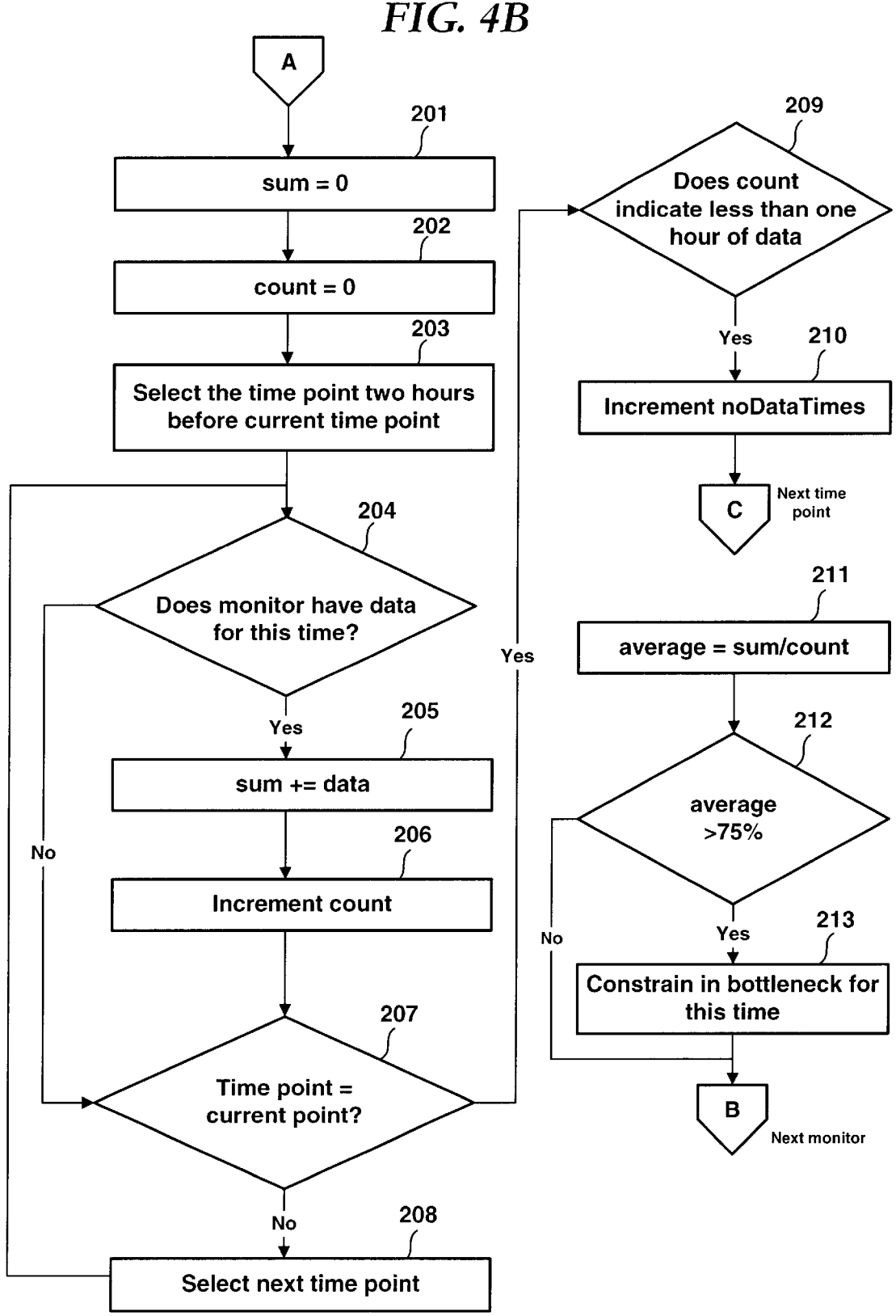

This flowchart of FIG. 4B shows how the method processes each monitor for each time point. In boxes 203 to 208, the method sums up the previous two hours of data. It rejects any time points where there is no data. This typically indicates that the system was turned off. Box 209 tests to see if the system was turned on at least half the time. If not, then the data is rejected for this time point and a counter is updated in box 210 in order to keep track of how much this condition has occurred. Note the assumption here that if one monitor does not have data for this time point, none of them do for the entire system, so we skip the other monitors and go to the next time point.

In box 211, the average is computed for the two hours. In 212, if the average is over 75%, then this monitor is constrained in 213.

By way of explaining 213, the method keeps a cumulative bottleneck for the current time point, and it adds to the bottleneck while it is processing the time point. The bottleneck contains the following information:

The frequency of the bottleneck (number of times it has occurred).

A list of the monitors that are constrained in the bottleneck, and the frequency of each one (number of times that it was constrained).

A list of the components that are constrained in the bottleneck, and the frequency of each one (number of times it was constrained).

The first time the bottleneck occurred.

The last time the bottleneck occurred.

The type of the bottleneck, which is determined by the component types involved in the bottleneck. This can be computed from the list of components.

The bottleneck is constructed in 213 during iterative passes through the loops. None of the frequencies in the bottleneck will exceed 1 since at this point, the bottleneck is only describing a single time point.

Figure 4C:
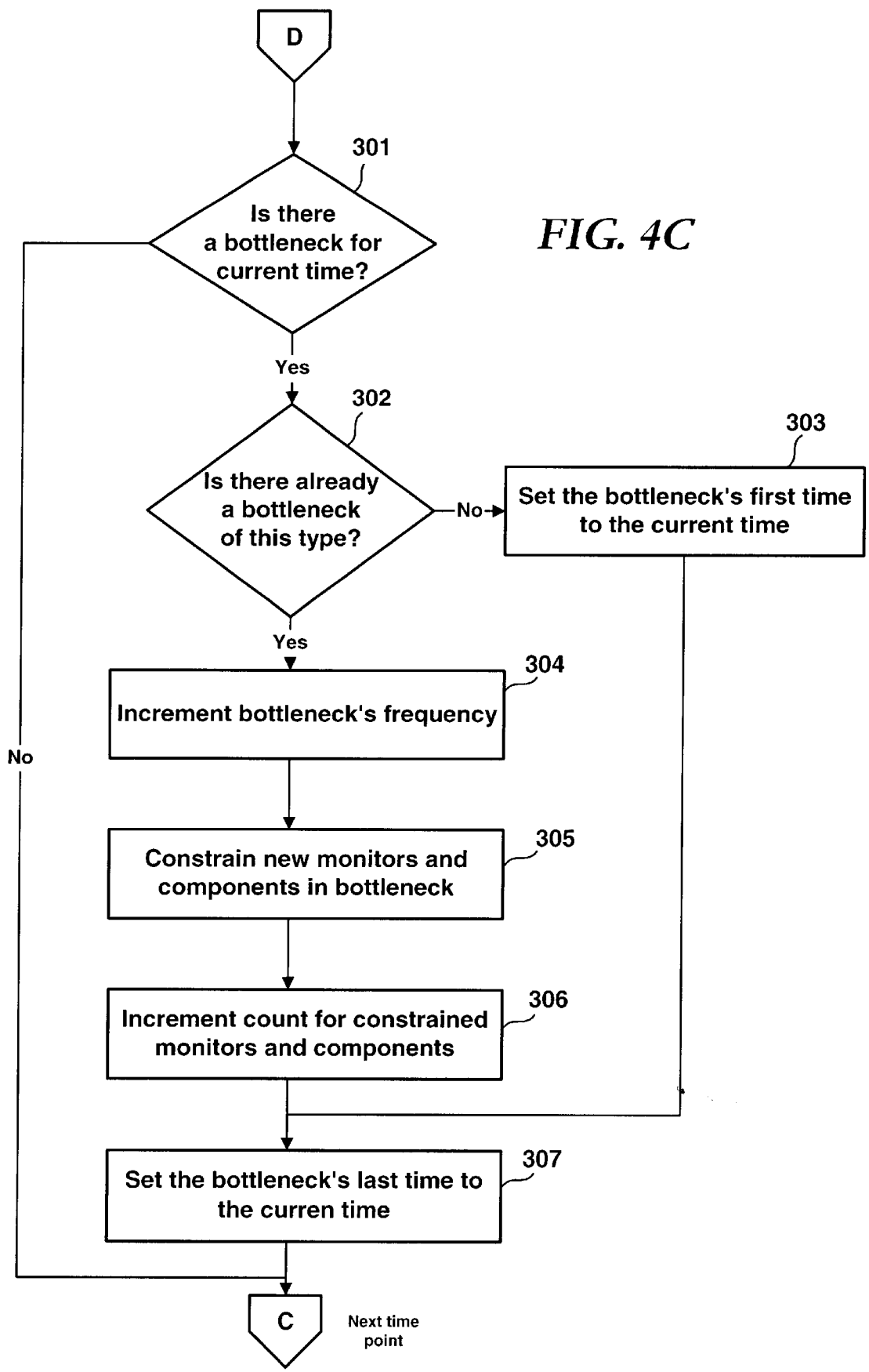

The flowchart of FIG. 4C shows how the method finishes processing each time point after it has processed each monitor.

Box 301 checks the cumulative bottleneck that contains the results of analyzing all of the monitors (see 213). If any of the monitors were bottlenecked, box 302 checks to see if there has already been a bottleneck for the same combination of component types. For each system, the method only keeps one bottleneck of each type. For example, there is only one CPU Bottleneck, only one Memory Bottleneck, only one CPU+Memory Bottleneck, and so forth. The types of components that are constrained determine the type of the bottleneck. If the same type of bottleneck has already occurred, the method updates the preexisting one in boxes 304 to 307. Otherwise, a new bottleneck of this type is added in box 303.

Figure 4D:
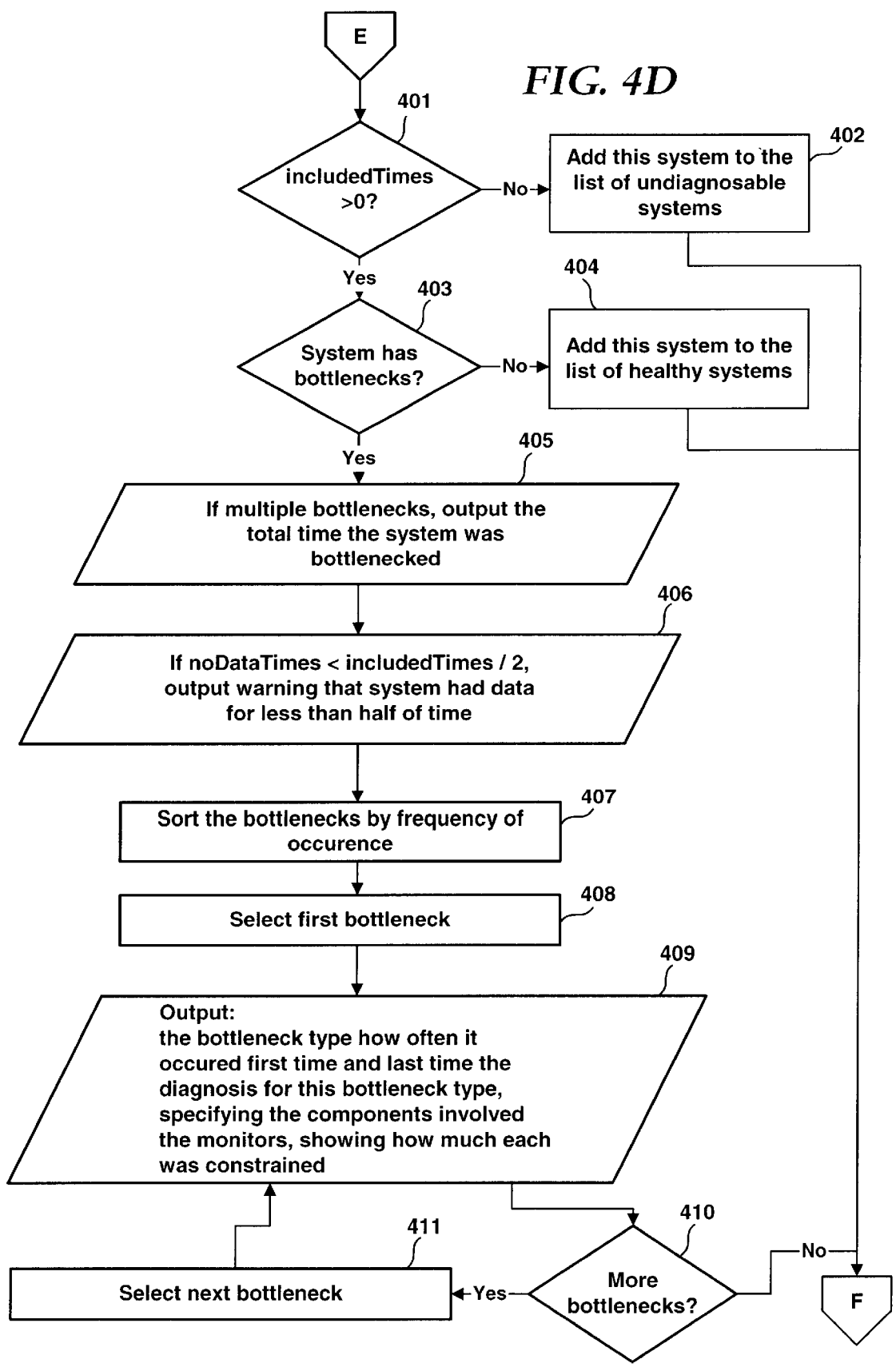
Figure 4E:
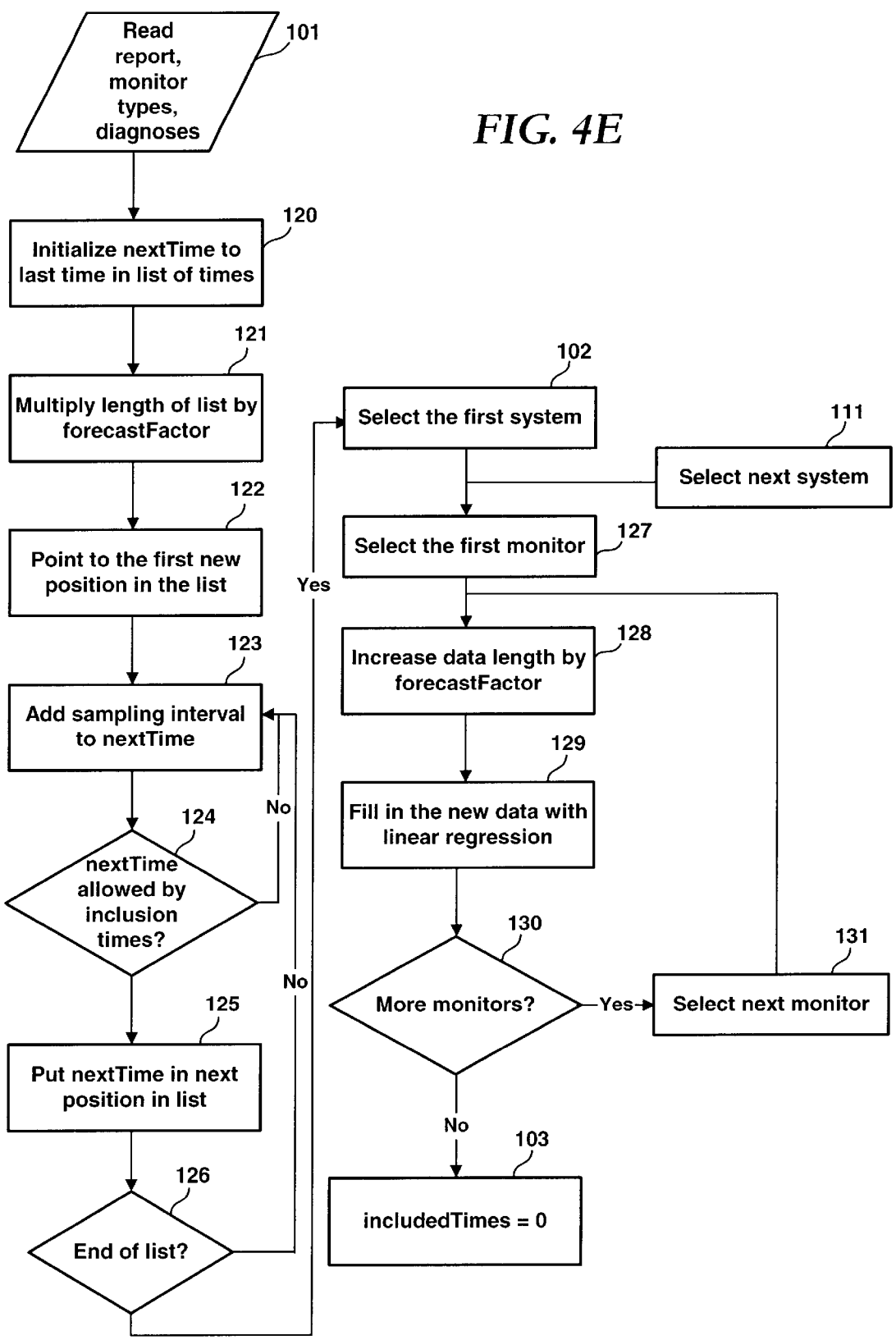

The flowchart of FIG. 4D shows how the method processes each system after all of the time points have been analyzed. Box 401 tests to see if includedTimes is nonzero. A zero value in this counter indicates that the system did not have two hours of consecutive data. In this case, the system is added to the list of undiagnosable systems in box 402 and we go on to the next system.

Box 403 tests to see if the system has any bottlenecks. If none were created by the analysis, then this system is added to the list of healthy systems in box 404.

If there are multiple bottlenecks, box 405 outputs the total time that the system was bottlenecked. If there is only one bottleneck, then there is no need to do this because it will be obvious to the user.

If a system does not have data for at least half the time, then box 406 warns the user that the diagnosis is less reliable. This is computed with the counters that were updated in 107 and 210.

Box 407 sorts the bottlenecks by frequency of occurrence. Recall that there is only one bottleneck of each type, containing the accumulated instances of that bottleneck throughout the report. The bottleneck type that occurred most frequently is listed first.

Box 409 outputs each bottleneck type that has occurred for the system. It uses the process outlined above (in item 2 of the method's inputs) to select the appropriate diagnosis for this bottleneck type. It fills out the diagnosis with the specific components and monitors that contributed to the bottleneck, and how much each one was constrained.

The flowcharts do not show the following features of an embodiment of the present invention which may be added, as desired, by one of ordinary skill in the field: The systems are sorted according to total frequency of bottleneck. Hence, the system that is bottlenecked the most is output first. The output is organized into Recommendations and Details. Each system is tested to see if it contains at least one monitor for each component type. Otherwise it is added to the undiagnosable list. If the user clicks on one of the underlined monitor names, the system displays a graph of that monitor. It would be trivial for one skilled in the art to add these enhancements.

The method uses several values that can be modified by the user. The threshold for each monitor defaults to 75%, but can be changed on a per-monitor basis. Other customizable numbers include: The length of the sliding average. The default is two hours. How much of the sliding average must contain data. The default is 50%. What percentage of the report interval must have data for the server before a warning is issued; the default is 50%. What percentage of the report interval must a bottleneck exist for in order to be listed in the Recommendations section; default is 25%.

The present invention modifies FIG. 4 from the System Recommendation Patent. Boxes 101, 102, 103, and 111 in FIG. 4E are given as reference points from the flowcharts in that Patent, and FIGS. 4A–4D in this document. Boxes 120 and higher are inserted.

All of the systems in the report share the same list of timestamps. Therefore, it is efficient to extend the list of time stamps into the future before the method begins iterating through systems. Boxes 120 to 126 cause the list of timestamps to extend into the future. The default forecastFactor is 2.0. This means that if the original list covers one month, the revised list will cover two months. The first month of the revised list will be the original list, and the second month will be the extension into the future. The forecastfactor can be any floating-point number greater than 1.0. The forecastFactor is read from an input file in the preferred embodiment but could be set in the user interface in other embodiments.

In boxes 120 through 126, the variable nextTime always contains the timestamp that will be written into the next position in the list of timestamps. It is initialized in 120 to the time that the real data ends in the report. In 121 the length of the list is increased to create empty positions in which to write the new timestamps, and in 122 the method points to the first empty position. In 123, nextTime is incremented by the sampling period. For example, if the timestamps in the original report are 5 minutes apart, then nextTime is incremented by 5 minutes each pass through the loop. Box 124 skips times that are not included by the inclusion times. For instance, if only the hours 9:00 am to 5:00 pm are included, then the times that fall between 5:00 pm and 9:00 am the next day are skipped by box 124. This causes the forecasted portion of the list of timestamps to adhere to the same pattern as the original portion.

When the list of timestamps is extended, the method begins iterating through systems in 102. This is according to the original flowchart. However, the revised flowchart then extends the monitor data for the current system so that it will correspond to the extended timestamp list. Box 128 increases the list of data points for each monitor by forecastFactor, just as the timestamp list was lengthened. Note that the monitors may not all have the same sampling frequency, so it is important to use a multiplication factor rather than adding a number because the ratio of timestamps to data points must be maintained. Box 129 uses linear regression to fill in the newly created empty positions in the monitor data. The existing data is analyzed to find the best-fit line, and this line is used to compute the future data. This process is repeated for each monitor in the system. Each monitor is analyzed individually, without regard for how it interacts with the others.

However, the preferred embodiment uses a programming interface to perform the forecast so that another forecasting algorithm can be substituted in the future without changing the rest of the algorithm. This is possible because from 103 on, the bottleneck detection method proceeds as if no forecast had been performed. With the exception of box 113 (see below), the method never needs to know whether it is analyzing real or predicted data. When it comes to the end of the real data, it keeps going into the predicted data without knowing the difference. So it would be possible to plug in a forecasting algorithm that used, for example, cyclic analysis or that took into account how the monitors interact.

The only time the method needs to consider whether the data is real or predicted is when it has encountered a bottleneck. The following flowchart modifies box 113 from the original flowchart.

Figure 4F:
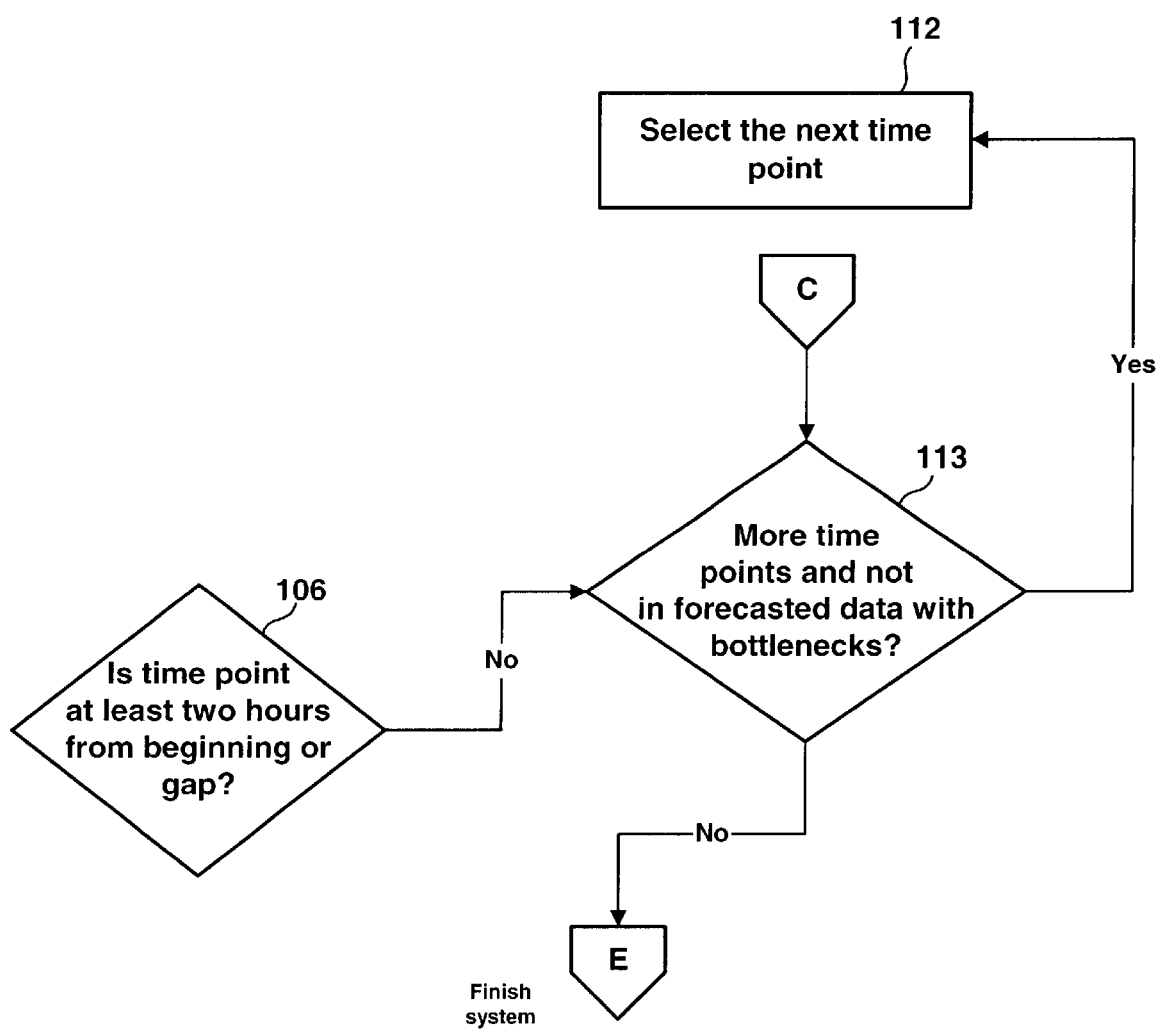

FIG. 4F illustrates another change to the flow of FIGS. 4A–4D to accommodate the forecasting of the present invention. Before forecasting was introduced into the present invention, box 113 in FIG. 4A would always go to the next time point if there was one via 112. However, if we are in forecasted data it is necessary to check and see if any bottlenecks have occurred in the past. If a bottleneck occurred in the past and we are in forecasted data, then finish processing the current system via "E" and do not continue to analyze it for bottlenecks. Once a bottleneck has occurred, the monitor data no longer behaves in a linear fashion and the forecast is invalid from that time point on. If the bottleneck occurred in the real data, then no forecast data will be analyzed at all. If the bottleneck occurs in the forecast data, then it is the only bottleneck that will be found since it stops the analysis. This implies that only one bottleneck can ever be found in forecast data.

The only other modifications to the original invention are in the output process. In box 406 in the original disclosure, if the system did not have enough data to be analyzed for at least half the time, then a warning is generated. A warning was generated in the original invention, but it is customized if the bottleneck is forecasted. This is shown in the sample output for System D. System D is included in the Details section but not in the Recommendations section because it triggered the warning in 406.

In addition, the output in box 409 must be enhanced to handle a forecasted bottleneck. For example, the "first and last time" and "how long it occurred" strings should be modified because we only know when it will begin to occur. Systems A and D illustrate this change in the sample output.

Figure 5:
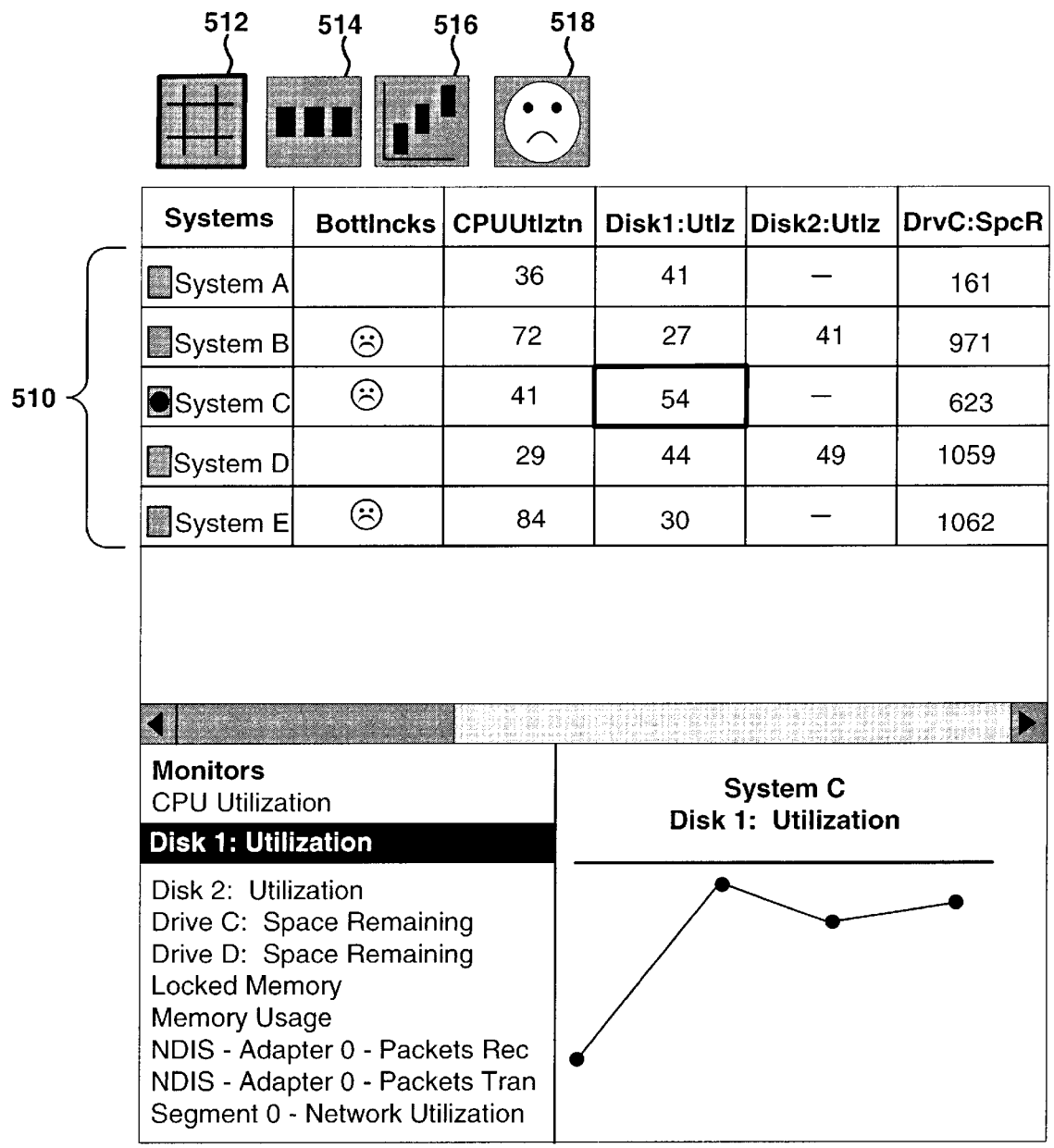

FIGS. 5–7 are examples of reports from the present invention. FIG. 5 is an output from the system of the present invention, preferably in the form of a HTML page available for review over an intranet or the Internet. A top pane 510 (e.g., in FIG. 5) is used to select a system to graph. (In some situations, it also selects a monitor, though the lower left pane is usually used for this.) Four buttons 512, 514, 516 and 518 at the top control the top pane. There are four options for the top pane: The first button 512 displays a table in the top pane. This button is currently selected, as is indicated by the box around the button. The table is currently displayed in the top pane. The first column has the heading "System" and lists all of the systems with their icons. The second button 514 displays a list of icons in the top pane. This allows a large number of systems to be viewed at once, using the same icons that are seen in the first column of the table. The third button 516 displays the HyperGraph in the top pane. The system icons are positioned on a graph but are still functional as icons, as described in the Performance Display patent. The fourth button 518 displays the Performance Analysis output in the top pane. The first three buttons are as described in the Performance Display Patent referenced above. However, the fourth button 518 is new and is used to access the invention. The button has a face that is frowning to indicate that at least one of the analyzed systems has a problem with a recommended remedy. If no problems were found, an appropriate symbol such as a smiling face would be displayed. If analysis were in progress, the face would have its eyes closed in a thoughtful expression. If analysis is not possible due to insufficient data, then the face would look dead. Of course, the selection of the appropriate symbols is within the selection of the designer, so long as the user can understand the results.

Now, FIG. 6 results when the fourth button is selected. The top pane shows the Recommendations, as described in the disclosure. The bottom two panes are unchanged.

Notice that "Go to details" is underlined for each system. This is the conventional way of indicating a hyperlink which the user should click on. Suppose the user clicks on the hyperlink for "Go to details" for System B, resulting in FIG. 7

The scroll bar has moved down to a later portion of the output where the details of System B's bottlenecks are given. The bottom two panes have not changed. However, now suppose the user selects "CPU Utilization" which is underlined in the top pane. The screen of FIG. 8 results.

FIG. 9 illustrates the report using forecasting of the present invention. The solid line 902 illustrates the result of actual data, the dashed line the forecast into the future using statistical techniques and the dotted lines 906, 908 indicate the prediction interval or forecast interval, computer using known statistical techniques for calculating the prediction interval. FIG. 9 shows that the forecast exceeds the threshold 910 in the future, so that the system has not bottlenecked yet, but is projected to do so where the dashed line 912 crosses the threshold 910. Alternatively, the intersection of the forecast intervals 906 and 908 intersect the threshold 910 at 914 and 916, respectively, indicating that the system is likely to exceed the threshold between the time associated with the point 914 and the point 916.

A typical report from this prediction is as follows:
System A Details
Bottleneck: LAN Adapter. This bottleneck has not occurred yet, but it may occur on Tue Sep. 29, 1998.
To graph the constrained resources, click on:
NDIS—Adapter 0—Packets Received
To improve performance:
Add faster LAN technology to LAN Segment 0.
Add another LAN adapter and migrate users from LAN Segment 0 to the new LAN subnet.
It is desirable to measure and record the utilization of each component type by using some combination of monitor types. For each type of component, there are alternative types of monitors that could be used to determine the utilization. The above monitor types are the ones that were most convenient in the preferred embodiment, and are given by way of example. Other types of monitors that could be used include LAN bytes per second, LAN packets or frames per second, CPU instructions per second, disk I/O operations per second, and disk bytes per second read and written. The preferred embodiment runs on a platform that provides a number of monitors, such as IBM's Netfinity or Tivoli software.

The monitors are considered "passive" because they observe the systems without effecting them. Other performance analysis methods use active techniques. (For example, see BlueCurve Dynameasure by Bluecurve, Inc. 2201 Broadway, Suite 700 Oakland, Calif. 94612.) These methods intentionally induce artificial workloads in the systems in order to determine performance characteristics. The drawbacks of this approach are that it is disruptive to the network, and the artificial load on the network may not resemble the actual load in the real world. The subject invention avoids these drawbacks by using passive monitors.

Experimentation has shown that a server's response time begins to increase exponentially when resource utilization reaches a threshold that is between 60% and 80%. (See Computer-Communications Network Design and Analysis, Mischa Schwartz, Prentice-Hall, Inc. Englewood Cliffs, N.J. 07632.) The preferred embodiment considers a component constrained when one of the above-performance monitors averages over 75% for a period of at least two hours. A component meeting this criterion will noticeably degrade the server's performance. In our model it does not matter whether the monitor value that constrained the component is 76% or 100%, because a component is either constrained or not constrained. Though the invention allows the user to adjust the 75% threshold for each monitor, the user is advised to leave the threshold at its default.

A "bottleneck" occurs on a system when one or more of its components are constrained. A bottleneck is identified by a unique combination of constrained component types. For example:

If CPU 1 is constrained at a particular time, this is a CPU bottleneck. If CPU 2 is constrained at a later time, it is also a CPU bottleneck. The invention considers these two bottlenecks to be one bottleneck for much of the analysis. This illustrates that it is the component type that defines a bottleneck, and not the specific component.

If the "Network Utilization for Adapter 1" monitor is constrained at a particular time, this is a LAN bottleneck. If the "Packets Transmitted by Adapter 1" monitor is constrained at a later time, this is also a LAN bottleneck. The invention considers these two bottlenecks to be one bottleneck for much of the analysis. This illustrates that it is the component type that defines a bottleneck, and not the specific monitor or monitor type.

If CPU 1 and LAN Adapter 1 are both constrained, it is a CPU+LAN bottleneck. It is not two bottlenecks, but one. This illustrates that it is the combination of component types that defines a bottleneck.

Since there are four component types in the preferred embodiment, there are fifteen possible bottleneck types. (This is two raised to the fourth power, minus one for the case of zero which means no bottleneck.) Each of the fifteen bottleneck types has a different diagnosis. This is best explained by a few examples:

If Disk 1 is constrained, it causes a disk bottleneck. The user is advised to add disks or to move active data files from Disk 1 to under-utilized disks to better balance the disk workload.

If CPU 1 is constrained, it causes a CPU bottleneck. The user is advised to upgrade to faster or additional CPUs.

If memory is constrained, it causes a memory bottleneck. The user is advised to add the appropriate amount of memory.

If CPU 1 and memory are both constrained, it causes a memory +CPU bottleneck. The user is advised to add memory AND to upgrade to faster or additional CPUs. In this case, the recommendation is simply the combined recommendations for the individual components.

If memory is constrained and one or more disks are constrained at the same time, it is a memory+disk bottleneck. The user is advised to add memory. The user is NOT advised to add disks or to move active data files from Disk 1 to under-utilized disks. The invention realizes that the constrained memory is most likely causing disk thrashing, so there is no benefit in working with the disk devices. In this case, the recommendation is NOT the combined recommendations for the individual components. After a memory upgrade is performed the invention can be used in an iterative fashion to re-analyze the status of the system. The invention would then correctly identify unlikely cases when combinatorial bottlenecks such as memory and disk I/O occur that are not related.

The last example shows that components in a bottleneck can interact. If a type of component is in a bottleneck with other types of components, it may mean something completely different than if the component type is in a bottleneck alone. This is why each combination of component types (memory, disks, LAN adapters, CPUs) causes a different type of bottleneck.

The invention gives suggestions to the user which include information about the specific components and monitors that created the bottleneck. The type of bottleneck, and hence the diagnosis, is determined only by the component types. But the specific components and monitors must be included in the diagnosis so that the user has enough information to address the problem.

Many modifications of the present invention will be apparent to those skilled in the arts to which the present invention applies. Further, it may be desirable to use some of the features of the present invention without the corresponding use of other features. For example, the present invention has been described in the context of monitoring hardware performance and in making recommendations for changes in the hardware to improve the performance of the system, while software forms and integral part of the present invention and defines many of the capabilities of the system. Analysis of the performance of software and consideration of changes to the software could be accomplished in a rather straight forward way without departing from the spirit of the present invention. Further, the interaction between the hardware and software components could be used to advantage in monitoring the performance of the combined system, and those skilled in the relevant arts would be able to include software indicators of performance, if desired. Furthermore, the performance of other elements of the hardware and additional rules could be added to the system described without difficulty, and the use of other rules could be used with good results. Accordingly, the foregoing description of the present invention should be considered as merely illustrative of the principles of the present invention and not in limitation thereof.

What is claimed is:

1. A method of analyzing performance of a computer system and for providing recommendations for changes in the system to improve its performance, the steps of the method comprising:

receiving and storing indicators of the performance of components of the computer system at periodic times;

applying stored rules to the stored indicators to analyze the performance of the computer system;

project future performance of the computer system based upon past indicators;

detecting a projected undesirable condition of the computer system based upon the future performance projections based on past indicators;

in response to the detecting of an undesirable condition of the computer system, providing a recommendation to alleviate the performance of computer system by ameliorating the projected undesirable conditions of the computer system; and analyzing the undesirable conditions to determine the most severe undesirable condition and reporting it first.

2. A method of analyzing performance of a computer system and for providing recommendations for changes in the system to improve its performance, the steps of the method comprising:

receiving and storing indicators of the performance of components of the computer system at periodic times;

applying stored rules to the stored indicators to analyze the performance of the computer system;

project future performance of the computer system based upon past indicators;

detecting a projected undesirable condition of the computer system based upon the future performance projections based on past indicators;

in response to the detecting of an undesirable condition of the computer system, providing a recommendation to alleviate the performance of computer system by ameliorating the projected undesirable conditions of the computer system;

calculating a prediction interval indicative of the probability that the future performance will be within the prediction interval; and displaying the prediction interval and the future performance prediction so that the projected undesirable condition can be seen.

3. A method of analyzing performance of a computer system and for providing recommendations for changes in the system to improve its performance, the steps of the method comprising:

receiving and storing indicators of the performance of components of the computer system at periodic times;

applying stored rules to the stored indicators to analyze the performance of the computer system;

project future performance of the computer system based upon past indicators;

detecting a projected undesirable condition of the computer system based upon the future performance projections based on past indicators; and in response to the detecting of an undesirable condition of the computer system, providing a recommendation to alleviate the performance of computer system by ameliorating the projected undesirable conditions of the computer system;

wherein the step of detecting and undesirable future condition includes the step of projecting date on which the undesirable future condition may occur.

4. A method of analyzing performance of a computer system and for providing recommendations for changes in the system to improve its performance, the steps of the method comprising:

receiving and storing indicators of the performance of components of the computer system at periodic times;

applying stored rules to the stored indicators to analyze the performance of the computer system;

project future performance of the computer system based upon past indicators:

detecting a projected undesirable condition of the computer system based upon the future performance projections based on past indicators;

in response to the detecting of an undesirable condition of the computer system, providing a recommendation to alleviate the performance of computer system by ameliorating the projected undesirable conditions of the computer system; and determining at least one remedy for the detected undesirable condition and providing a report of the undesirable condition which has been detected and a proposed remedy for the condition;

wherein the step of providing a report includes the step of preparing a report in an Internet format and includes making the report accessible over the Internet.

5. A method of analyzing the performance of a computer system and providing a report on the undesirable future condition including the steps of claim 4 wherein the step of preparing a report in Internet format includes the step of including a symbol indicating that additional detail on the undesirable condition is available by clicking on the symbol.

6. A method of analyzing performance of a computer system and for providing recommendations for changes in the system to improve its performance, the steps of the method comprising:

receiving and storing indicators of the performance of components of the computer system at periodic times;

applying stored rules to the stored indicators to analyze the performance of the computer system;

project future performance of the computer system based upon past indicators;

detecting a projected undesirable condition of the computer system based upon the future performance projections based on past indicators;

in response to the detecting of an undesirable condition of the computer system, providing a recommendation to alleviate the performance of computer system by ameliorating the projected undesirable conditions of the computer system; and providing an indication when the data from such analysis may be unreliable.

7. A system for projecting one or more undesirable conditions in a computer system and for recommending an action to alleviate the determined undesirable conditions, the system comprising:

a first module for receiving and storing indicators of the performance of components of the computer system over the time period;

a second module for applying rules to the stored indicators of performance to determine whether an undesirable condition exists;

a third module for projecting future operation of the computer system from the stored indicators if no undesirable condition has been determined in the stored indicators, said module including a statistical tool to project the indicators into the future;

a fourth module for determining the projected future operations of the computer system is an undesirable condition and for recommending a solution for ameliorating the undesirable condition;

a fifth module responsive to the detection of an undesirable condition of the computer system and providing a recommendation to alleviate the performance of computer system by ameliorating the projected undesirable conditions of the computer system; and a sixth module for analyzing the undesirable conditions to determine the most severe undesirable condition and reporting it first.

8. A computer readable medium with a program stored thereon, the stored program comprising:

a module for determining if a bottleneck condition has occurred in the past based on stored indicators of performance over a past period of time;

a module for projecting future indicators based on the stored indicators of performance over the past period of time, said projected indicators using statistical analysis of the stored indicators if no bottleneck has occurred in the past period of time;

a module for analyzing the projected future indicators based on a definition of a bottleneck condition in the determining module for a projected bottleneck which has not yet occurred but which is projected to occur and for providing the recommendation to ameliorate the projected bottleneck condition;

a module for reporting the projected bottleneck condition and a projected date on which it may occur with a recommendation for ameliorating projected bottleneck condition.

9. A computer readable medium with a stored program including the elements of claim 8 wherein the stored program further includes a module for generating a prediction interval which is indicative of the confidence of the prediction.

10. A computer readable medium with a stored program including the elements of claim 9 wherein the media further includes a display module for providing visual display of the stored indicators and future projected indicators and the prediction interval.

11. A computer readable medium with a stored program including the elements of claim 10 wherein the display module further includes code for displaying in an Internet format data which indicates a bottleneck threshold and the future projected indicators.

12. A computer readable medium with a stored program including elements of claim 9 wherein the program includes a module for determining which of several bottleneck is the most serious and for presenting the most serious bottleneck first in the report of the bottleneck conditions.

* * * * *